United States Patent Office 3,531,304
Patented Sept. 29, 1970

3,531,304
INFRARED TRANSPARENT GLASSES
Heinz Bromer, Kreis Wetzlar, and Norbert Meinert and Johann Spincic, Wetzlar, Germany, assignors to Ernst Leitz, G.m.b.H., Wetzlar (Lahn), Germany
Filed June 1, 1966, Ser. No. 554,469
Claims priority, application Germany, June 3, 1965, L 50,843
Int. Cl. C03c *3/12, 3/30*
U.S. Cl. 106—47   5 Claims

ABSTRACT OF THE DISCLOSURE

Glasses which are transparent to infrared radiation consist essentially of 63–98 parts by weight of at least two members selected from the oxides of W in a quantity up to 46 parts by weight, Mo in a quantity up to 60 parts by weight, Bi in a quantity up to 50 parts by weight or As in a quantity up to 55 parts by weight, the selection including at least one member of the sub-group consisting of molybdenum oxide or arsenic oxide. The glass also contains from 2–37 parts by weight of at least one member selected from the oxides of Mg, Ca, Sr, Ba or Pb. Such glasses may contain in addition up to 25 parts by weight of atimony oxide and up to 15 parts by weight of at least one member selected from the group consisting of the oxides of Zr, Th, Te, Ta, or Ni. The glasses are substantially free of phosphates.

---

Our present invention relates to infrared transparent glasses whose index of refraction and partial dispersion are widely variable.

Infrared transparent glasses are known which are specially useful for optical systems in combination with a superionoscope, a picture-forming tube on an infrared spotter, an image changer or converter and on an electronic lens and optical lens converter. By way of example, numerous glasses are known which are molten on a base of arsenates or arsenites. A disadvantage of these glasses consists in their chemical sensitivity and moreover in that the optical values can be reproduced only with great difficulty. The cause of this is in the low melting- and sublimation point of arsenic oxides.

A further disadvantage of the known infrared transparent glasses is that they differ from each other only insignificantly in their indices of refraction and in their dispersions. This leads to special difficulties in the correction of the optical systems in which they are used.

Our invention relates to infrared transparent glasses which do not exhibit the above mentioned disadvantages. A special advantage is that they permit, in accordance with their special compositions, a special variation in their refractive index and partial dispersion values.

The glasses are, in accordance with our invention, melted down of mixtures which consist of from 63 to 98 percent by weight of oxides of the elements of the V and VI groups of the periodic system. To be used specially are $WO_3$ up to 46 percent by weight, $MoO_3$ up to 60 percent by weight, $BiO_3$ up to 50 percent by weight, $Sb_2O_3$ up to 25 percent by weight and $As_2O_3$ up to 55 percent by weight. Supplements to the above comprise the oxides and/or fluorides of the bi-valent elements, magnesium, calcium, strontium, barium and lead between 2 and 37 percent by weight. For adjustment of special optical values there can be added up to 15 percent by weight of oxides of the elements of the IV group of the periodic system such as tantalum- and/or niobium oxide from the V group of the periodic system and tellurium oxide from the VI group of the periodic system. It is suitable to select an amount of the zirconium oxide not over 3 percent by weight, thorium oxide up to 3 percent by weight, tantalum- and/or niobium-oxide up to 5 percent by weight and tellurium oxide up to 10 percent by weight.

In the following Table 1 three examples are given in which in each case two of the above mentioned oxides of the V and/or VI groups of the periodic system are used. The remainder of the complementary and additive oxides consists of oxides of the above mentioned bi-valent elements.

TABLE 1 IN PERCENT BY WEIGHT

| Melt No. | $WO_3$ | $MoO_3$ | $Bi_2O_3$ | $As_2O_3$ | MgO | BaO | PbO |
|---|---|---|---|---|---|---|---|
| BoS 182 | 20.0 | 60.0 | | | 2.0 | 18.0 | |
| BoS 188 | 30.0 | 50.0 | | | 2.0 | 18.0 | |
| BoS 295 | | | 15.0 | 54.5 | | | 30.5 |

The following melting procedure applies for glasses of this type:

The well mixed, weighed, amount is melted down in an aluminum oxide crucible at a furnace temperature of about 1050° C. The melt is held at this temperature with constant stirring for about 10 to 40 minutes and is finally cooled to about 700° C. Upon reaching this temperature the melt is poured into previously heated carbon forms. The melts yield brown to brownish black colored glasses which are tempered at about 350° C.

In the immediately following Table 2, glasses are described which in each case contain three oxides of the above mentioned elements of the V and VI groups of the periodic system:

TABLE 2 IN PERCENT BY WEIGHT

| Melt Number | | | | |
|---|---|---|---|---|
| BoS 203 | BoS 249 | BoS 284 | BoS 183 | BoS 264 |
| $WO_3$, 30.0 | $WO_3$, 45.5 | $MoO_3$, 5.0 | $WO_3$, 10.0 | $Sb_2O_3$, 25.0. |
| $MoO_3$, 40.0 | $Bi_2O_3$, 37.5 | $Bi_2O_3$, 31.0 | $MoO_3$, 60.0 | $Bi_2O_3$, 31.0. |
| $Bi_2O_3$, 10.0 | $As_2O_3$, 10.0 | $As_2O_3$, 27.0 | $Sb_2O_3$, 10.0 | $As_2O_3$, 25.0. |
| MgO, 2.0 | $PbF_2$, 4.0 | PbO, 35.0 | MgO, 2.0 | PbO, 10.0. |
| $BaF_2$, 18.0 | $ZrO_2$, 1.5 | $Ta_2O_5$, 2.0 | BaO, 18.0 | $Ta_2O_3$, 2.0. |
| | $ThO_2$, 1.5 | | | $PbF_2$, 7.0. |

In these glasses the well mixed, weighed charge is melted down in an aluminum oxide crucible at about 1050° C. After the melt has been held at this temperature for about 30 to 45 minutes, it is cooled to about 700° C. and is then cast into preheated molds. The brown to brownish black colored glasses obtained by whese melts are tempered at temperatures of from 350° C. to 420° C. In each case the most favorable temperature is determined by a determination of the transformation point.

The next following Table 3 shows finally glass compositions in which in each case four oxides, of the V and VI groups of the periodic system are used for glass formation

TABLE 3, IN PERCENT BY WEIGHT

| Melt Number | | |
| --- | --- | --- |
| BoS 354 | BoS 266 | BoS 407 |
| $MoO_3$, 10.0 | $MoO_3$, 5.0 | $MoO_3$, 10.0 |
| $WO_3$, 30.0 | $Sb_2O_3$, 25.00 | $WO_3$, 30.0 |
| $Bi_2O_3$, 21.0 | $Bi_2O_3$, 31.0 | $Bi_2O_3$, 21.0 |
| $As_2O_3$, 10.0 | $As_2O_3$, 20.0 | $As_2O_3$, 15.0 |
| $MgF_2$, 2.0 | PbO, 10.0 | $MgF_2$, 2.0 |
| $BaF_2$, 17.0 | $PbF_2$, 7.0 | $BaF_2$, 17.0 |
| $TeO_2$, 10.0 | $Ta_2O_5$, 2.0 | $TeO_2$, 5.0 |

For the melting procedure the same conditions hold for the glasses of Table 3 as for those given for Table 2. The tempering follows at temperatures between 370° C. and 420° C. These melts give light brown to dark brown colored glasses.

A change of the index of refraction, as illustrated for example in Table 4, infra, upon substitution of tellurium oxide for arsenic oxide is, in itself, a quite common effect in the manufacture of optical glasses. The index of refraction of tellurium oxide is substantially above the refractive index of arsenic oxide. Because of this, a higher tellurium oxide portion in a melt mixture produces a higher index of refraction of the glasses molten therefrom. It is an effect of similar nature to that in which magnesium oxide is substitued for barium oxide in a visual zone, in which the substitution of the barium oxide increases the index of refraction. Similarly it is also self-evident in other melt compositions in which even the mentioned changes in optical properties are made possible. A basic condition for this is, however, a suitable starting assembly which permits the use of various oxides for variations in optical values.

It has proven specially advantageous to moisten the mix with halogen-containing organic substances before placing the mix into the melting crucible. The advantage is thereby obtained that the last traces of water are driven off in the melting.

In the accompanying drawings the transparencies of certain of the examples are delineated. In particular the curve for example BoS 407 shows the results that one can obtain by this mix. In this chart the abscissa give the wave lengths in microns, the ordinate gives the percentage of rays transmitted and d gives the thickness in mm. of the glass through which the rays pass.

Figure 1:
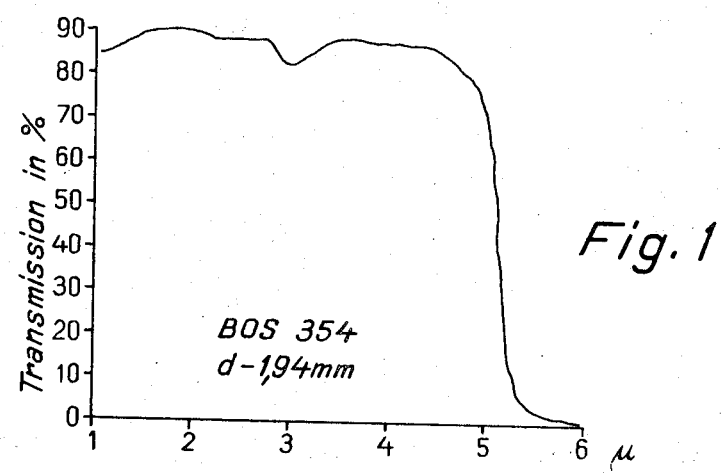
FIGS. 1 to 3 are plots illustrating response characteristics of examples BoS 354, 407 and 264 respectively of Table 1 wherein the abscissae are the light wavelengths in microns and the ordinates are the percent transmissions of the light rays of spectrum indicated.
Figure 2:
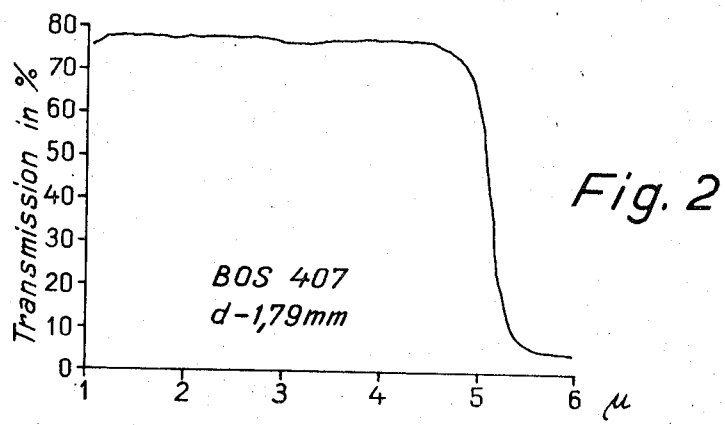
Figure 3:
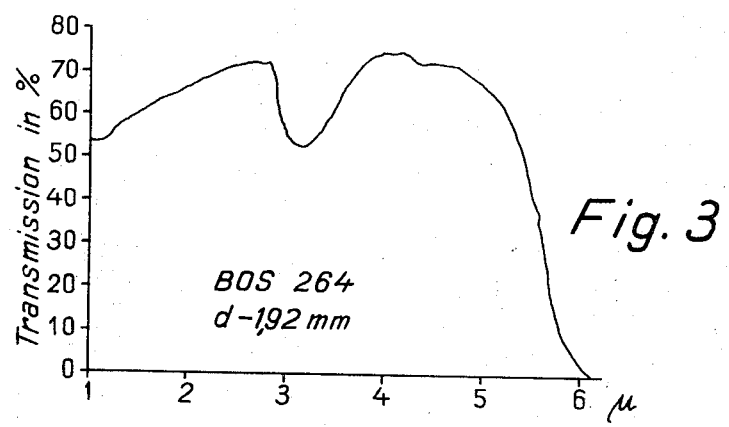
Figure 4:
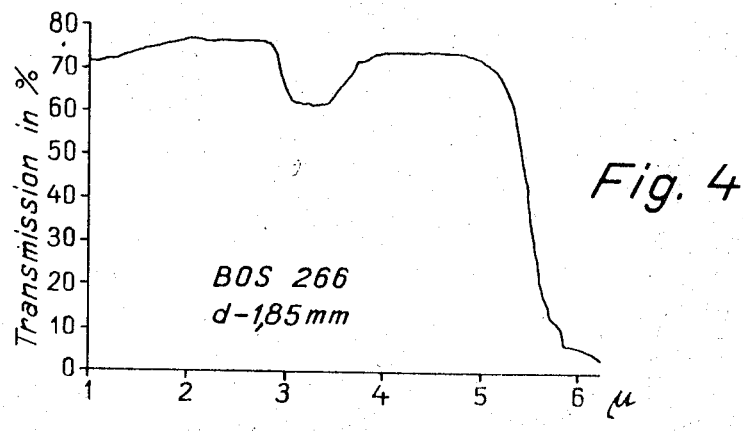
FIGS. 4 to 7 are similar plots of examples BoS 266, 295, 203 and 249 respectively.
Figure 5:
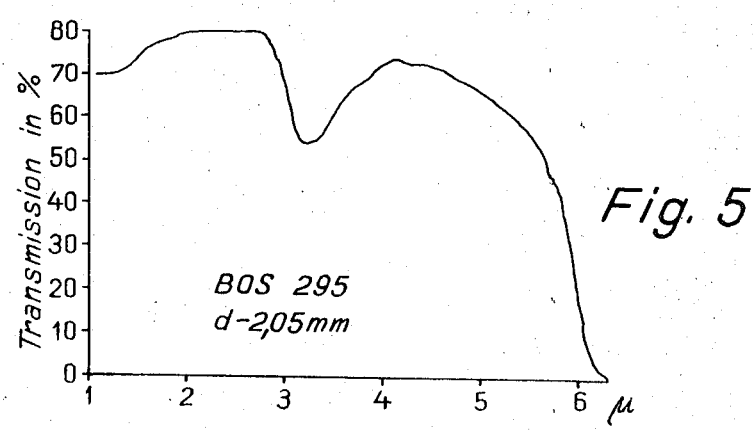

The curves show dips at various points indicating a relatively strong absorption in those wavelengths. The pronounced dip near or at the three (3) micron abscissae is caused by hydroxyl ions which are present owing to residual water in the melt. This drip may be obviated, as for example BoS 407 (FIG. 2), by removal of the hydroxyl ion. We have discovered this to be removable by moistening the mix with a halogen-containing organic compound such as carbon tetrachloride ($CCl_4$) which combines with the hydroxyl residues to form carbonic oxides and hydrochloric acid and/or chlorine which being gases leave no residues. The halogen-containing organic compound need not be used in stochiometric proportions as it also is volatile. It may be used in amount sufficient to saturate the melt as for example 0.3 to 0.4 ml. per gram of the mix.

Figure 6:
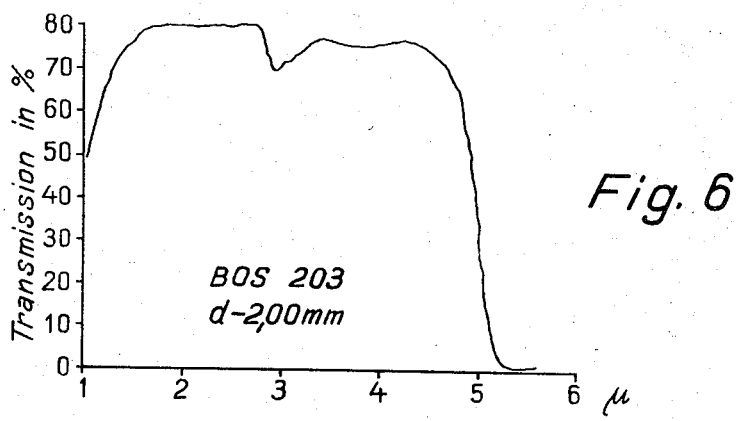
Figure 7:
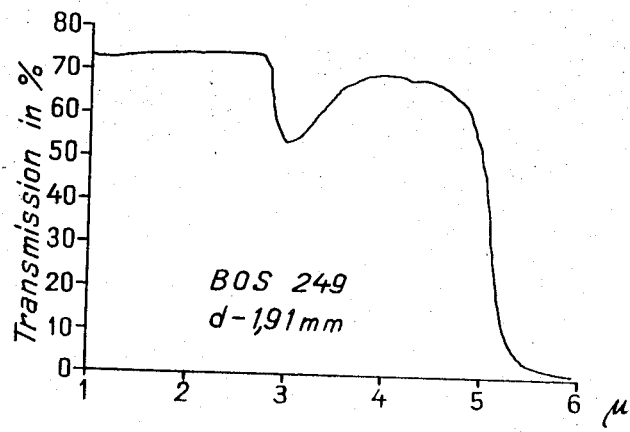
Figure 8:
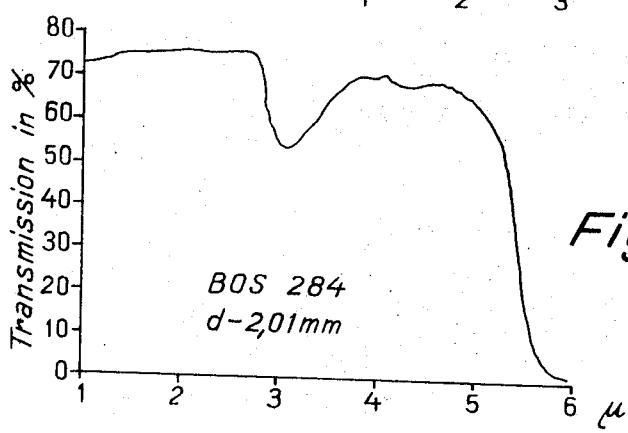
FIGS. 8 to 10 are similar plots of examples BoS 284, 182 and 188 respectively.
Figure 9:
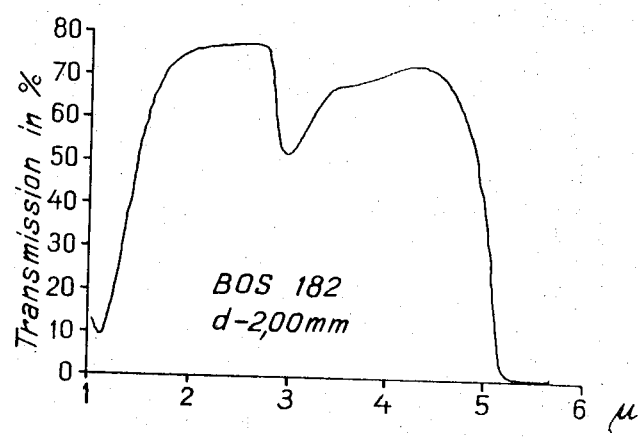
Figure 10:
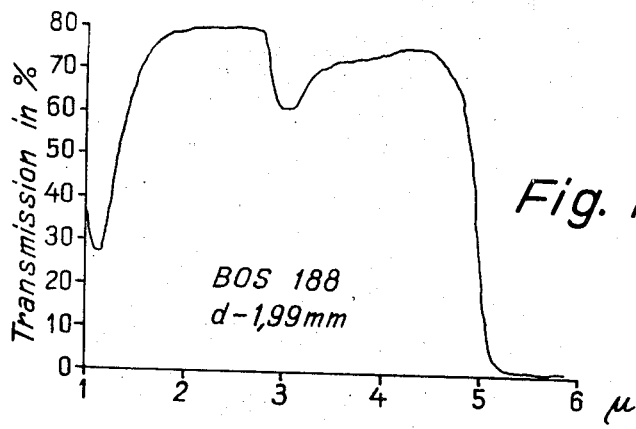

The dips in the transmission characteristic of certain mixes such as BoS 182, 188 and 203, FIGS. 9, 10 and 6 respectively, in the one (1) micron range, are caused by the high molybdenum oxide contents of such formed glasses. The molybdenum oxide, accordingly, causes a strong coloring of these glasses within the visible spectrum, but since the glasses of this invention are used in the infra-red range there is no disadvantage from such coloring.

The characteristic curves, thus, make clear to those skilled in the art the beneficial advantages of glasses made in accordance with this invention.

Further, as should be apparent to those skilled in this art, variation in certain optical values of a glass can be effected by varying the proportion parts of the oxides within the ranges indicated. Thus, for example, the percentage of arsenic oxide ($As_2O_3$) and tellurium oxide ($TeO_2$) in melts BoS 354 and Bos 407 (Table 3) were varied as indicated. The indices of refraction in the infrared range were found to be as listed in Table 4, following.

TABLE 4

| Wavelength, microns: | BoS 354 | BoS 407 |
| --- | --- | --- |
| 1.5 | 1.9055 | 1.8726 |
| 2.5 |  | 1.8580 |
| 3.0 | 1.8851 | 1.8496 |
| 4.0 |  | 1.8304 |
| 4.5 | 1.8566 | 1.8170 |

Having described our invention, we claim:

1. Glass transparent to infra-red radiation prepared from a melt consisting essentially of from 63–98 percent by weight of at least two members selected from the oxides of W, Mo, Bi or As, the members selected being present in the following percent by weight, W from about 10–46, Mo from about 5–60, Bi from about 10–38, As from about 10–55, the selection including at least one member of the sub-group consisting of molybdenum oxide or arsenic oxide, the balance of the melt consisting of from 2–37 percent by weight of at least one member selected from the oxides and fluorides of Mg, Ca, Sr, Ba or Pb, said glass being substantially free of phosphate.

2. A glass according to claim 1 which in addition contains up to 25 percent by weight of antimony oxide.

3. A glass according to claim 1 which in addition contains up to 15 percent by weight of at least one member selected from the oxides of Zr, Th, Te, Ta or Nb, wherein the upper limit for each in percent by weight respectively, is 3.0 for Zr, 3.0 for Th, 10.0 for Te, 5.0 for Ta and 5.0 for Nb.

4. A glass according to claim 2 which contains in addition up to 15 percent by weight of at least one member selected from the oxides of Zr, Th, Te, Ta or Nb, wherein the upper limit for each in percent by weight respectively, is 3.0 for Zr, 3.0 for Th, 10.0 to Te, 5.0 for Ta and 5.0 for Nb.

5. The glass of claim 1 which is free from hydroxyl ions.

References Cited

UNITED STATES PATENTS

| 2,477,649 | 8/1949 | Pincus | 106—47 |
| 2,853,393 | 9/1958 | Beck et al. | 106—47 |
| 2,863,782 | 12/1958 | Eubank et al. | 106—47 |
| 2,870,030 | 1/1959 | Stradley et al. | 106—47 |
| 3,278,318 | 10/1966 | Hensler et al. | 106—47 |
| 3,338,694 | 8/1967 | Davy. | |
| 2,518,194 | 8/1950 | Silverman et al. | 106—47 |

FOREIGN PATENTS

| 744,205 | 2/1956 | Great Britain. |
| 761,289 | 11/1956 | Great Britain. |
| 1,142,488 | 4/1957 | France. |
| 1,146,548 | 5/1957 | France. |

HELEN M. McCARTHY, Primary Examiner